D. C. LEWIS.
MECHANICALLY OPERATED GEAR CHANGING MECHANISM FOR AUTOMOBILES.
APPLICATION FILED OCT. 10, 1916.

1,264,403.

Patented Apr. 30, 1918.
4 SHEETS—SHEET 1.

WITNESS:
Rob't R. Kitchel.

INVENTOR
Dean C. Lewis
BY Frank S. Busser
ATTORNEY.

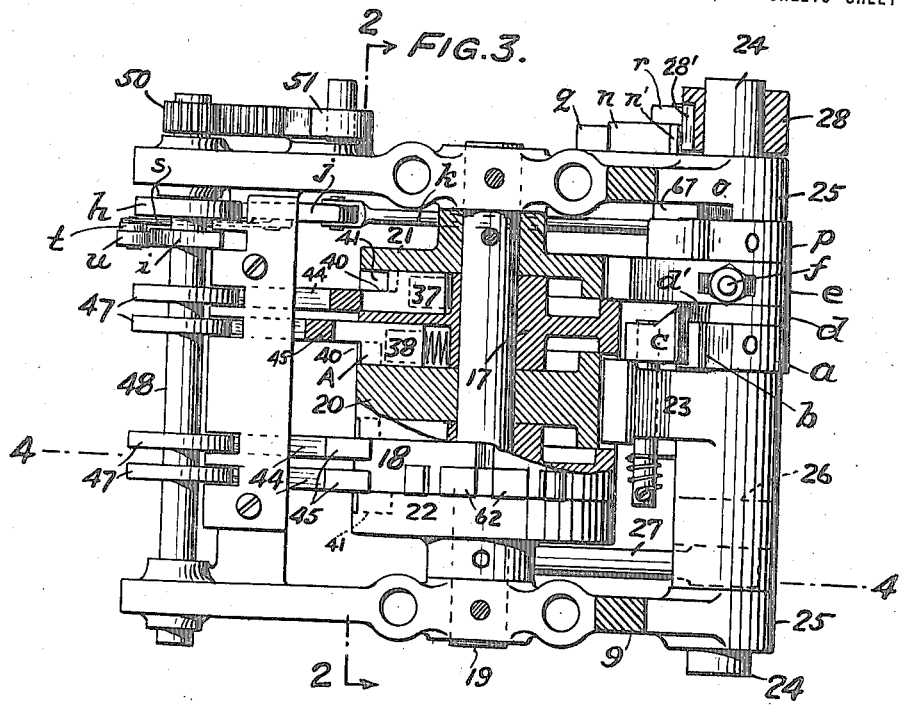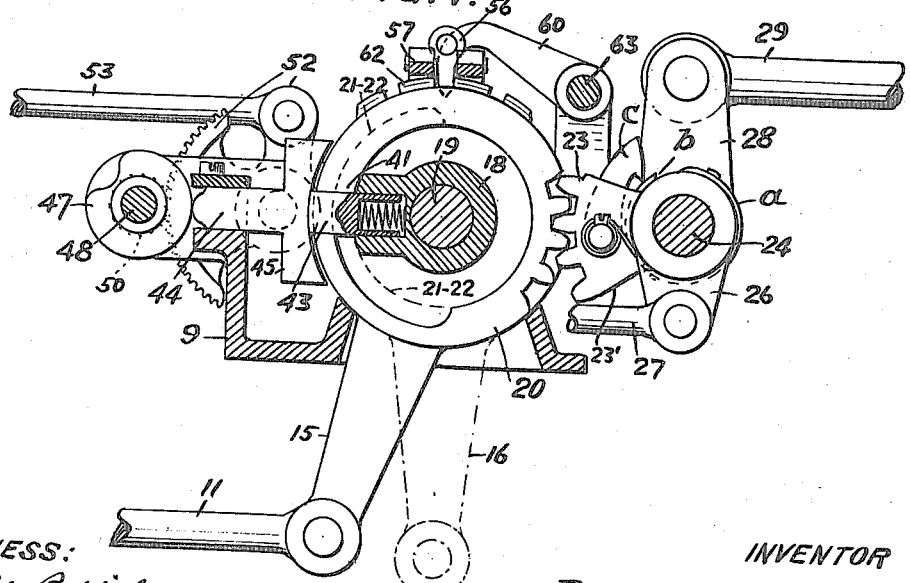

D. C. LEWIS.
MECHANICALLY OPERATED GEAR CHANGING MECHANISM FOR AUTOMOBILES.
APPLICATION FILED OCT. 10, 1916.

1,264,403.

Patented Apr. 30, 1918.
4 SHEETS—SHEET 3.

WITNESS:

INVENTOR
Dean C. Lewis.
BY
ATTORNEY

D. C. LEWIS.
MECHANICALLY OPERATED GEAR CHANGING MECHANISM FOR AUTOMOBILES.
APPLICATION FILED OCT. 10, 1916.
1,264,403.
Patented Apr. 30, 1918.
4 SHEETS—SHEET 4.
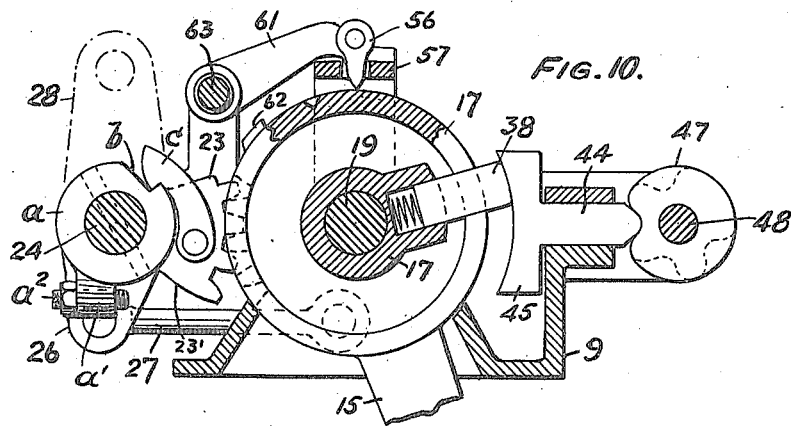
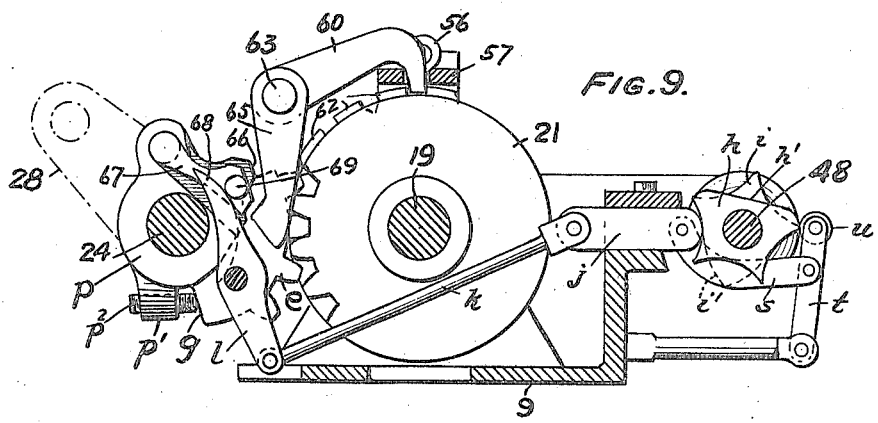
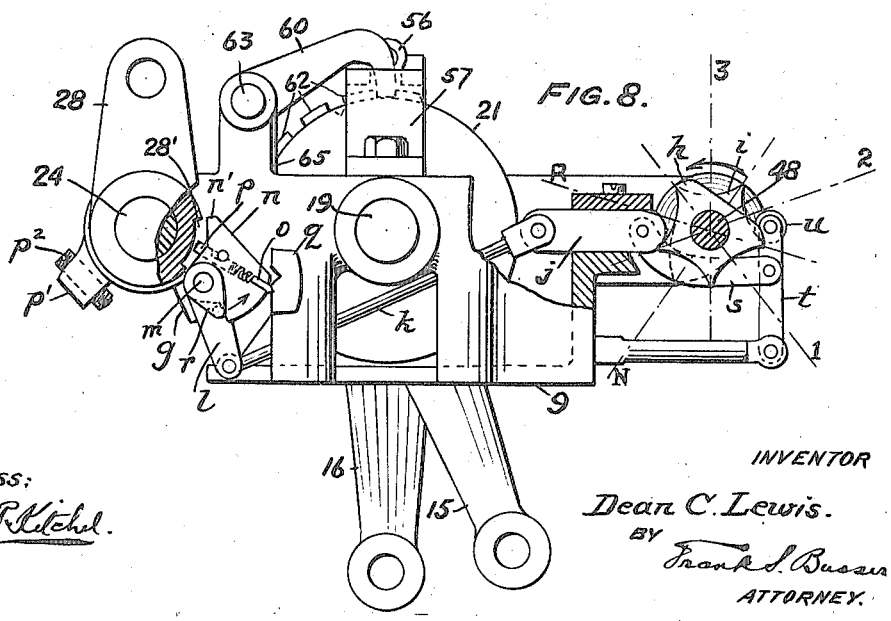
WITNESS:
Robt R Kitchel.
INVENTOR
Dean C. Lewis.
BY
Frank S. Busser
ATTORNEY.

UNITED STATES PATENT OFFICE.

DEAN C. LEWIS, OF PHILADELPHIA, PENNSYLVANIA, ASSIGNOR TO LEWIS MANUFAC-
TURING COMPANY, OF PHILADELPHIA, PENNSYLVANIA, A CORPORATION OF PENN-
SYLVANIA.

MECHANICALLY-OPERATED GEAR-CHANGING MECHANISM FOR AUTOMOBILES.

1,264,403.     Specification of Letters Patent.     Patented Apr. 30, 1918.

Application filed October 10, 1916. Serial No. 124,769.

*To all whom it may concern:*

Be it known that I, DEAN C. LEWIS, a citizen of the United States, residing at Philadelphia, county of Philadelphia and State of Pennsylvania, have invented a new and useful Improvement in Mechanically-Operated Gear-Changing Mechanism for Automobiles, of which the following is a full, clear, and exact description, reference being had to the accompanying drawings, which form a part of this specification.

The object of my invention is to provide for changing the gears of an automobile in such a manner that the operator, by the mere swing of a lever, or by the operation of some equally simple device to some predetermined position, may so adjust the mechanism that upon operating the ordinary clutch-shifting contrivance, the said mechanism will coöperate with other mechanism to effect the shift of the gears to a position corresponding to the position of said lever.

Mechanism adapted for this purpose is set forth in a patent issued to me January 18, 1916, No. 1,169,081. While the mechanism therein described and claimed is entirely practical, operative and efficient, the object of the present invention is to improve said mechanism so as to adapt it to a wider range and render its operation more nearly perfect. More specifically, the object of the present invention is to make provision for the shifting of the gears to take place entirely in the clutch releasing movement of the clutch lever, whereby the following operation may be effected: the first portion of said movement disengages the clutch; the second portion of said movement throws to neutral any gears that may be in mesh; the final portion of said movement throws into mesh such gears as have been selected. In case neutral is selected, all gears remain out of mesh. The return movement of the clutch lever merely throws in the clutch, and has no part either in the selection or shifting of the gears.

The advantages of this arrangement will be readily appreciated. In the first place, it insures that the shifting of the gears positively takes place before the car moves, and this is a very important feature. The gears are shifted during the forward stroke of the clutch lever and the car cannot move until the return movement of the lever has allowed the clutch to act.

The importance of this arrangement is perhaps best appreciated when the car is in what may be called an emergency position and it is necessary to stop and back out immediately, as in the case of a car on the brink of a precipice, or the edge of a wharf or on the right of way of a railroad crossing.

Furthermore, it insures the positive movement of the gears by the operator instead of relying on the clutch spring to do it, and a much lighter clutch spring may be used on the car.

Usually the last portion of the forward stroke of the clutch lever, after the clutch has been disengaged, operates a brake for the purpose of slowing up the gears so they will readily mesh when a new selection is made. With the present arrangement no such brake action is required, as the shift of the gears is so rapid that it comes up to the revolving speed of the gears and they are always thrown readily into mesh without any chattering or uncertainty of action.

Other advantages will readily occur to those familiar with existing gear changing devices. I will now proceed to describe in detail a preferred embodiment of my invention, in connection with the accompanying drawings, in which:

Fig. 3 is a plan view of the device, partially in section.

Fig. 4 is a cross section on line 4—4 of Fig. 3.

Fig. 8 is a view looking in the direction of arrow 8, Fig. 5, partly broken away.

Fig. 9 is a cross section on line 9—9 of Fig. 5.

Fig. 10 is a cross section on line 10—10 of Fig. 5.

Figure 1:
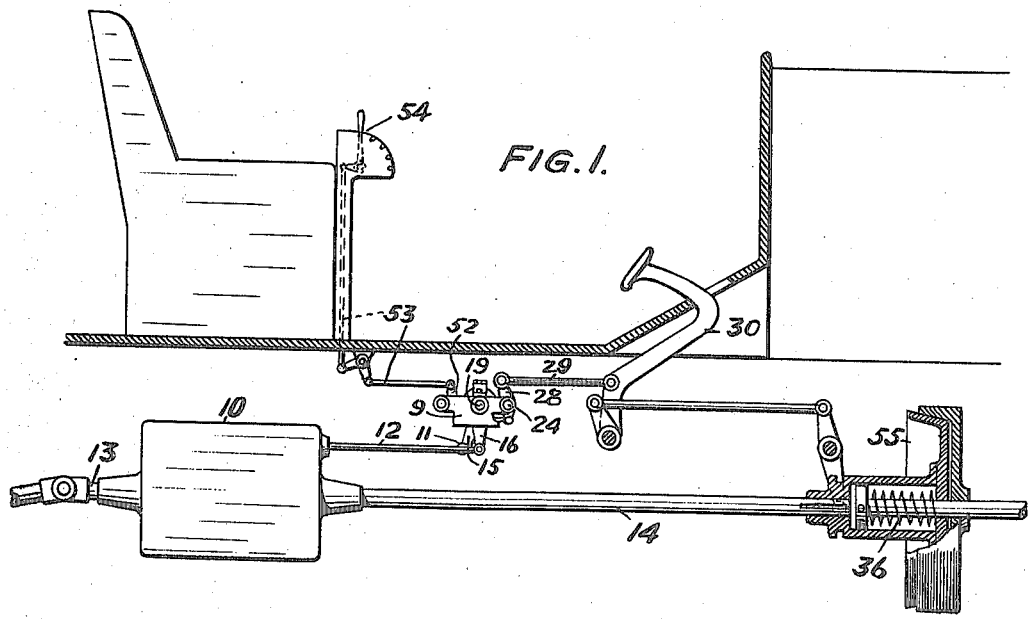
Figure 1 is a more or less diagrammatic view showing the device applied to an automobile.
Figure 2:
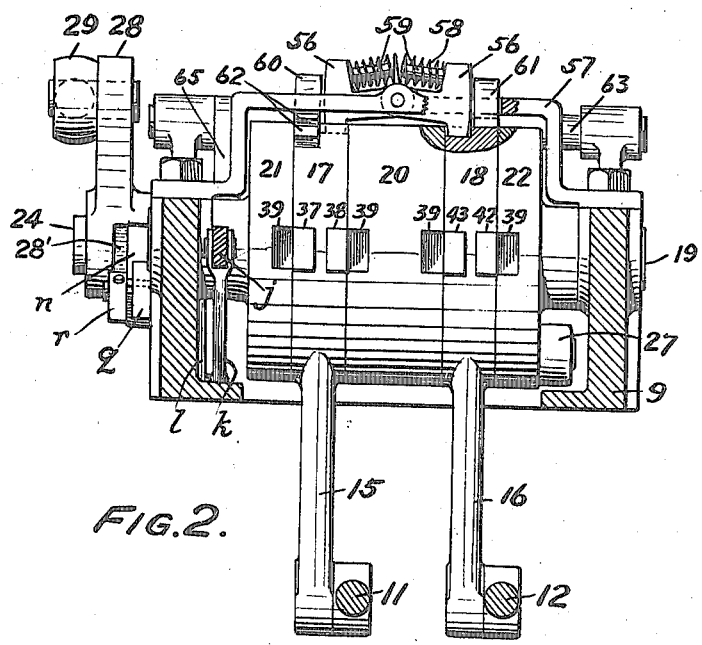
Fig. 2 is a section on line 2—2 of Fig. 3.
Figure 6:
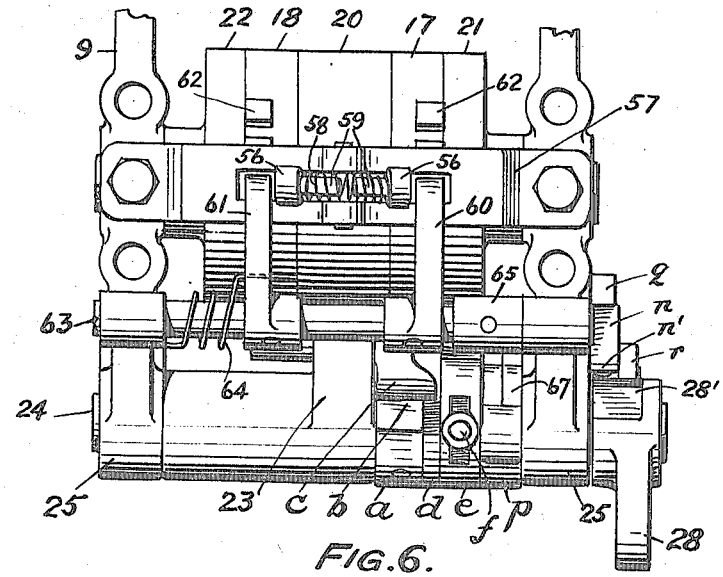
Fig. 6 is a partial plan view.
Figure 7:
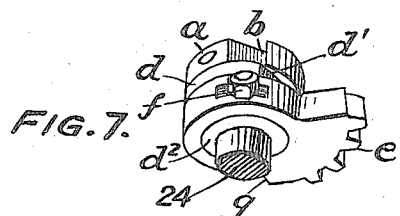
Fig. 7 is a perspective view of a portion of the device.
Figure 5:
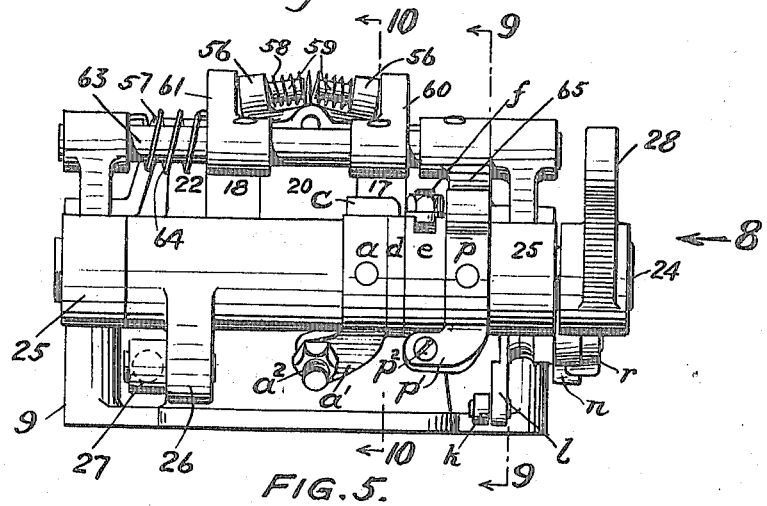
Fig. 5 is an elevation of the device looking at the right hand side of Fig. 3.

Up to a certain point the mechanism of the present invention is similar in every respect to that of my Patent No. 1,169,081, above referred to, and for convenience, I have given those parts the same designative numerals they bear in the patent, to which reference can be made for a more detailed description of the mode of operation of such old part of the present mechanism.

The gear case 10 contains any usual arrangement of change gears, adapted to be shifted by means of rods 11 and 12 so as to give the driven shaft 13 the usual varying speeds from the driving shaft 14, namely: reverse, zero or neutral, and first, second and third speeds forward. Rods 11 and 12 are connected to arms 15 and 16 depending from hubs 17 and 18 turnable on spindle 19.

It may be assumed, for example, that when arms 15 and 16 occupy a medial position, the gears are in a neutral position and not in mesh to transmit any motion to shaft 13. When hub 17 is turned to draw rod 11 in one direction, say toward the gear case, as shown in Figs. 1 and 4, the gears are shifted so as to give shaft 13 motion in the reverse direction. When hub 17 is turned to move rod 11 away from the gear case, the gears are shifted to give shaft 13 motion in the same direction as the driving shaft, at low or first speed. Similarly, when hub 18 is turned from medial position to move rod 12 toward or away from the gear case, the gears in the latter are shifted to give shaft 13 second or third speed ahead respectively.

The above described gear-change is typical of those in common use, and hence no more detailed description thereof is necessary, as it forms no part of my invention. It will be understood however, that the number of changes may be more or less than above described, and the number of hubs, like 17 and 18, made to suit the number of shifts required.

A central disk 20 is mounted to turn on spindle 19, between hubs 17 and 18, and end disks 21, 22 are mounted on the outside of hubs 17, 18, but pinned to the shaft. The central disk 20 has teeth cut in a portion of its periphery, which mesh with similar teeth in an arm 23 mounted loose upon a rock shaft 24 turnable in bearings 25 in the frame 9. An arm 26 depending from the hub of arm 23 is connected by a link 27 with end disk 22.

A collar $a$ is pinned to rock shaft 24, next to arm 23. Collar $a$ is provided with a notch $b$, and arm 23 carries a spring-pressed hook $c$ for engaging therewith.

By this means, as may be readily seen, turning rock-shaft 24 in clock-wise direction (Figs. 3 and 4) when hook $c$ is latched in notch $b$, gives a similar turn to disks 21, 22, through link 27, but turns disk 20 in the opposite direction.

The projecting end of rock-shaft 24 carries an arm 28 actuated by a rod 29 from the clutch lever 30, which is manually operable to release the clutch 55 against the action of its spring 36.

Mounted on the rock shaft, next to collar $a$, is another collar $d$, provided with a cut-away portion forming a cam surface $d'$. Collar $d$ is loose upon the shaft and is formed with a sleeve portion $d^2$, upon which is mounted a toothed arm $e$, whose teeth mesh with similar teeth cut in a portion of the circumference of end disk 21, as shown particularly in Figs. 3 and 9. Arm $e$ is secured to the sleeve of collar $d$ by the slot and set screw $f$, which allows of adjustment.

It will thus be seen, in the forward movement of the clutch lever, which turns rock shaft 24, as before described, in a clock-wise direction (Figs. 3 and 4) and end disks 22 and 21 similarly, that arm $e$ will be turned by its teeth in the opposite direction. This turns also collar $d$; and the parts being so set that cut away portion $d'$ is beside notch $b$ and hook $c$ latched therein, as in Fig. 10, collars $a$ and $d$ turn in opposite directions, and at one point cam surface $d'$ forces hook $c$, which is wide enough to engage both $a$ and $d$, out of engagement with notch $b$.

A collar $p$ is secured on rock shaft 24 beside arm $e$ thereon, and is provided with a depending tail $p'$, offset to one side to be in line with a shoulder $g$ on arm $e$.

During the portion of the stroke just described, arm 23 has been turning disk 20 in counter clock-wise direction, and all gears have been turned to neutral, as will be hereinafter explained. Also (looking at Fig. 8) during this motion the offset tail $p'$ has been approaching the shoulder $g$ and the set screw $p^2$ is so adjusted that as soon as hook $c$ leaves notch $b$, screw $p^2$ will contact with shoulder $g$ as in Fig. 9, and further movement of the clutch lever forces arm $e$ up, that is, reverses its movement. Reversing the movement of arm $e$, reverses the movement of disks 21 and 22, and through link 27, reverses also the movement of disk 20, so that at this point, when the gears have been brought to neutral, all three disks are suddenly turned in the opposite direction, and during this portion of the stroke gears are brought into mesh in the gear case as will be hereinafter described.

These two movements of the disks, back and forth, are produced in the same portion of the forward stroke of the clutch lever as was heretofore employed in merely moving them in one direction and bringing the change gears to neutral. Thus, the new action of the disks, and consequently of the gear shift, is extremely rapid, so rapid in fact, that it has been found the gears have no difficulty in meshing, even on high speed, without the teeth sliding past each other or chattering.

I will now proceed to a description of the gear shifting and selecting mechanism.

Shifting arms 15 and 16 are operated from disks 20, 21, 22, as follows: Hub 17 of arm 15 carries radially slidable dogs 37, 38. Disk 21 is cored out interiorly to admit dog 37, and the resulting peripheral flange, which turns in contact with a similar flange on hub 17, has an opening 39, which, together with a similar opening in flange of hub 17, admits the passage of dog 37 therethrough. The opposite face of hub 17, engaging dog 38, contacts with disk 20, which has a flanged face similar to flange on disk 21.

In a similar way hub 18 of arm 16 carries radially slidable dogs 42, 43, and is cored out interiorly on both sides, the same as hub 17. Also disk 22 is cored out like disk 21, and openings 39, through the resulting flanges, permit the passage of dogs 42, 43, therethrough.

Whereas, however, hubs 17, 18, are cored out so as to leave a flange on both faces, which is of constant width and relatively thin, the actuating disks 20, 21, 22, have flanges with relatively thicker portions, which form abutments 41. On opposing faces of the disks these abutments come on opposite faces of the dogs, one on the top and the other on the bottom. For instance, both faces of disk 20 are cored alike, and the abutment 41 is seen to be on top of the dogs, Fig. 4. The coring out of the opposing faces of disks 21, 22, is indicated in Fig. 4 by the dotted lines marked 21—22, and the abutments here come on the bottom of the dogs. Each of the dogs is provided with a cut-away portion 40, which will allow it, in its inner radial position, to be cleared by the relatively thin flange, when the disks are turned, but not by the abutments 41, which thereupon act to turn the dogs.

The dogs are spring-pressed outwardly, but are normally held in their inner radial position by their outer ends always being in contact with the heads 45 of four plungers 44, slidably mounted in the frame 9 in alinement with the respective dogs. These plungers in turn are normally held in such position by cams 47, mounted on a cam shaft 48. Each cam 47 bears against a plunger 44, and has a low point which, when in the turning of the cam shaft it is presented to the plunger, allows the latter to be pressed outwardly by its spring. In this position the flange of the disk will no longer clear the cut-away portion 40 of the dog, as shown at A, Fig. 3. Hence, a clock-wise turning of disk 20, such as is given it in the second portion of the movement before described, will turn dog 38, and with it hub 17, around into the position shown in Fig. 10, thereby shifting two of the gears into mesh to produce one of the forward speeds or reverse, according to the arrangement of gears in the gear box.

If it had been dog 37, instead of dog 38, which was allowed by its cam 47 to be in outward position, as disk 21 always turns in the opposite direction to disk 20, the flange of disk 21 would act against dog 37 to lock hub 17 to disk 21, and the hub, with its arm 15, would be turned in the opposite direction to that shown in Fig. 10, and the corresponding gears would be shifted into mesh in the gear box.

Thus, arm 15 may be turned in one direction or the other, according to which of its dogs 37, 38, is allowed to be sprung outward, locking the hub 17 of the arm to either disk 21 or 20. Similarly, when the gears have been thrown and the clutch lever is again operated, the disks are first turned in the opposite direction, when the dog that is out is acted upon by its abutment 41 to return the arms and gears to neutral.

According to this arrangement it is necessary that no more than one of the dogs 37, 38, 42, 43, shall be in outward position at any one time. This is brought about by securing the four cams 47 to cam-shaft 48 in such positions that no two low points are in line with each other. That is, the low points of the different cams are staggered angularly with respect to each other, the circle being divided into five 72° angles, cams 47 each having a low point in one of these angles, the fifth angular space being reserved as a neutral space. Thus, when shaft 48 is turned so as to bring the fifth angular space in line with the dogs, no low part on any of the cams 47 is in line therewith, and therefore no dog can be pressed out and no gears thrown into mesh.

In order to provide for the emergency situation above mentioned, I have secured a cam $h$ on cam-shaft 48 with a low part $h'$ occurring in the fifth angular space just referred to. This cam has four high points corresponding to the four operative positions of the selector cams, and between the high points are low parts, one of which, $h'$, occurs in the fifth angular space as stated and the other three occur between the selector points, that is, the low part $h'$ is active when selection is set for neutral, but the other low parts are only active during the setting of the selector for a shift, and with no dwell, just while the selector is being turned.

When low part $h'$ of this cam is in active position, it renders operable mechanism which prevents the engine clutch from engaging and therefore prevents the car from being moved by the engine.

Cam $h$, in connection with a complementary cam $i$, acts upon a plunger $j$ which in turn is connected by a rod $k$ with an arm $l$ turning a rocker $m$. Pivoted on this rocker is a dog $n$, which is provided with two plungers $o$, $p$, in line with each other and pressed apart outwardly by a common intermediate spring.

The normal position of dog $n$ is fixed by plunger $o$ being pressed into a small detent in a block $q$ secured to the frame 9. In this position the nose $n'$ of the dog clears the circle of the hub of the main actuating arm 28.

This hub has a cut-away portion 28' into which nose $n'$ is pressed as every selection is made, and unless it is withdrawn, prevents full movement of arm 28 on its return throw. That is, arm 28, being connected directly with the engine clutch arm, when nose $n'$ takes into cut-away portion 28' and is allowed to remain there on the return of the clutch lever, is prevented from returning far enough to allow clutch 55 to become engaged by its spring 36, and therefore the car remains stationary.

This is accomplished by turning dog $n$ so that plunger $o$ is tripped out of the small detent and into the large detent in block $q$. A short arm $r$ is attached to the outer end of rocker $m$ in such position that its turned-in end acts to trip dog $n$ every time plunger $j$ enters one of the low parts of cam $h$, that is, every time a selection is made.

Arm $r$ does not turn dog $n$ sufficiently to put plunger $o$ into the bottom of the large detent, but merely over its beveled edge, in which position nose $n'$ lies upon the hub of arm 28, and when in the clutch-disengaging movement said arm is turned (to the left, Fig. 8) and presents cut-away portion 28' to nose $n'$; dog $n$ is further turned by the pressure of the spring upon plunger $o$ sliding it to the bottom of the large detent. In this position nose $n'$ has entered cut-away portion 28', but further turning of arm 28, to complete the clutch-disengaging movement, kicks it out again by the rear edge of the cut-away portion striking plunger $p$, and dog $n$ again occupies its normal inactive position.

The action of dog $n$ performs no particular function except when selection is made while the clutch is out. In such case arm 28 is at the forward end of its throw (to the left of the position shown in Fig. 8) when dog $n$ is tripped to press nose $n'$ against its hub. Then when arm 28 is allowed to return (to the right, Fig. 8), the lower edge of cut-away portion 28', in passing by dog $n$, does not force it out again, but gets by plunger $p$ by pressing it inward, and nose $n'$ remains to form a stop against the upper edge of the cut-away portion, preventing the clutch from becoming engaged.

Another pressure of the clutch lever will set the new gear selection and upon releasing it, the clutch will engage and the car move under its influence.

The use and operation of this mechanism can be more readily understood by describing its action in a concrete case.

Suppose an emergency situation such as approaching the edge of a precipice. The operator in his extremity will have time to stop his car and nothing more, so he presses down his clutch and brake levers. Now with his car stopped he wishes to reverse without the least forward movement. With his foot still holding the clutch out, he selects reverse. He then allows the clutch to shift toward its engaging position, but before reaching it, the arm 28 is arrested by the dog $n$, but the movement of shaft 24 has been sufficient to allow pawl $c$ to engage the notch $b$ of collar $a$. Consequently, when the clutch is again returned to its full off position, the gears are shifted to reverse, in which movement the dog $n$ is thrown out of locking position, thereby allowing the clutch to be returned to full engaging position, and the engine is now engaged with the car on the reverse.

Plunger $p$ has a slot and pin connection with dog $n$ which allows it enough end motion to allow being pressed in as above described. Normally it projects just far enough and at such an angle as to be tripped by the edge of the cut-away portion as the latter turns forward and to be harmlessly pressed in as it returns.

Plunger $j$ is connected by a link $s$ with an arm $t$ pivoted at one end to a fixed bracket and at its other end carrying a roller $u$ which engages cam $i$. The cams are so formed that when cam $h$ presents one of its low points to plunger $j$, in turning from one selection to another, cam $i$ presents a high point to roller $u$, thus positively drawing plunger $j$ the required distance to trip dog $n$ as described.

Collar $a$ has a depending tail $a'$ which is offset to one side to be in line with a shoulder 23' on arm 23. The purpose of this is to form a stop for the forward movement of the clutch lever. During the first portion of this movement tail piece $a'$ moves to the right, Fig. 10, and as hook $c$ is latched, arm 23 moves with it. But in the second portion of the movement, when hook $c$ is unlatched, arm 23 reverses its motion, and tail $a'$ and shoulder 23' approach each other, locking the mechanism from further movement in that direction when they meet. The tail piece is provided with a set screw $a^2$ by means of which the motion may be brought to a stop at the right moment, when the gears have entered into full mesh.

In order to operate the gear selecting mechanism, cam shaft 48 carries a pinion 50 operated by a quadrant on a lever 51 pivoted to the frame of the machine. Lever 51 is connected by rods and levers 53 with a selector 54. By turning the selector to any of the five detents shown, quadrant lever 51 is turned to bring the desired cam on shaft 48 with its low point presented to its plunger, thereby rendering it operative to produce the desired gear shift as hereinbefore described.

In order to preclude the possibility of more than one gear being shifted at any one time, I provide an interlock consisting of two pivoted arms 56 supported in a bracket 57 attached to the frame 9.

The ends of these arms have beveled projections held by a spring 58 in contact with hubs 17, 18, and engaging a detent provided in each hub corresponding to its central or neutral position.

Arms 56 carry pins 59 projecting toward each other, and with enough space left between their ends to allow one of said arms to ride out of its detent, but not both at the same time. Thus although both arms are pressed into the detents when levers 15, 16 are in central position, when one of the levers as 15 is turned to accomplish a shift, its arm 56 is forced out of the detent and its pin 59 contacts or almost contacts with the similar pin of the other arm 56, preventing its rising out of its detent, and, therefore, preventing the other lever 16 from being turned.

It is further desired to positively hold levers 15, 16 at all times in the positions in which they are set. For this purpose two fingers 60, 61 are also arranged to act upon the hubs of levers 15, 16, the ends of the fingers taking into square notches formed by projections 62 on said hubs. There are three such notches formed on each hub 17, 18, the central one corresponding to neutral position and one on each side corresponding to a gear shift.

Fingers 60, 61 are attached to a rod 63 supported in bearings on the frame 9, and are held by a spring 64 so that their ends are normally pressed into the notches formed by lugs 62 and positively prevent hubs 17, 18, from being turned.

The following arrangement is provided for raising these fingers out of the notches to allow of a shift being made.

A depending arm 65 is also attached to rod 63 in position to be acted on by collar $p$ on shaft 24. Normally arm 65 is not in contact with any part of collar $p$, but the collar has a cam surface 66 in such position circumferentially that when the clutch lever is pressed forward this cam surface turns by arm 65 and presses it out, against the action of spring 64, raising fingers 60, 61 at just the time the shift is being made.

Cam surface 65 is of just sufficient length to raise the fingers out of their notches, when they will ride on the next lug 62 of hub 17 or 18 that is being turned, and be pressed into the succeeding notch as it comes along. This cam is arranged to act in the second portion of the forward movement of the clutch lever, i. e., the portion in which gears are returned to neutral. Therefore cam 66 only suffices to hold the fingers out in the case when neutral is selected, and it must be prolonged in its action into the gear shifting portion of the clutch lever movement if said fingers are to be held out past the neutral notch.

For this purpose a lever 67 is pivoted in collar $p$, turning in a cut-away portion thereof, and provided with a cam surface which is normally held out in line with cam surface 66 prolonging the length thereof as desired to prevent fingers 60, 61 dropping into the neutral notch on hub 17 or 18 which is connected with the gear shift selected.

Thus in every gear shift selection except neutral, fingers 60, 61 are raised at the time hubs 17, 18 are turned, first one of them to neutral, and then one of them to shift a gear, and are not allowed to drop, by virtue of the cam surface of lever 67, until said gear shifting movement has been begun and the neutral notch of hub 17 or 18 has moved from under said finger.

An upward prolongation 68 from lever $l$ is arranged to contact with a pin 69 on lever 67 and press it outwardly into active position when the selector is set for any of the four positions 1, 2, 3 or reverse. The four high points of cam $h$ before mentioned are for this purpose, and are set so as to act upon plunger $j$ at the time one of the cams 47 is presenting a low point to its plunger 44, i. e., at each gear selection.

Thus at every gear shift, cam lever 67 acts with cam 66 to hold fingers 60, 61 out of the notches of hubs 17, 18 until the neutral notch is passed. But when the selection is set for neutral its low part $h'$ and high point $i'$ of cam $i$, turn level $l$, not only to trip dog $n$, but also to render inactive lever 67, and allow arm 65 to slip over the edge of cam surface 66, letting fingers 60, 61, drop into the next notch, which is the neutral position.

In Fig. 8, I have shown by broken lines marked 1, 2, 3, R. N. the relative positions of the five angular settings of the cam-shaft to cams $h$ and $i$.

Having now fully described the construction and operation of a mechanism embodying my invention, what I claim and desire to protect by Letters Patent is:—

1. In a gear shifting mechanism for automobiles, the combination with clutch shifting mechanism adapted to be operated in opposite directions to apply and release the clutch, of gear changing mechanism adapted to be shifted from positive position first to neutral and then to a positive position, selecting means to dictate the operation of the gear changing mechanism, a turnable member connected with and actuable by the clutch shifting mechanism, two connections for operating the gear changing mechanism respectively in one direction to neutral and in the opposite direction to a positive position, and means operable by the turnable member, in part of its movement in one direction, to operate the gear shifting mechanism in the first named direction, and means operable by the turnable member in another part of said movement, to operate the gear shifting mechanism in the second named direction, thereby enabling the gears to be changed from one positive position to the other in a movement of the clutch shifting mechanism in one direction.

2. In a gear shifting mechanism for automobiles, the combination with clutch shifting mechanism adapted to be operated in opposite directions to apply and release the clutch, of gear changing mechanism adapted to be operated to adjust the gears first to neutral and then to one of their positive positions, selecting means adapted to dictate the position to which the gear shifting mechanism shall adjust the gears, a shaft, a member turnable on said shaft and adapted to actuate the gear changing mechanism to shift the gears from a positive position to neutral, another member turnable on said shaft and adapted to actuate the gear changing mechanism to shift the gears from neutral to a positive position, means actuable by the shaft, in its turning movement in one direction, to successively operate said members, and connections from the clutch shifting mechanism to said shaft.

3. In a gear shifting mechanism for automobiles, the combination with clutch shifting mechanism adapted to be operated in opposite directions to apply and release the clutch, of gear changing mechanism comprising disks connected to turn in opposite directions, and means operated by the disks to effect different adjustments of the gears, selecting means to render either disk operative, a shaft, a member turnable on the shaft and connected with one disk to turn it in one direction, a second member turnable on the shaft and connected with the other disk to turn it in the same direction, means actuable by the shaft, in its turning movement in one direction, to successively actuate said members, and connections from the clutch shifting mechanism to said shaft.

4. In a gear shifting mechanism for automobiles, the combination with clutch shifting mechanism adapted to be operated in opposite directions to apply and release the clutch, of gear changing mechanism adapted to be operated to adjust the gears to different speed positions, selecting means adapted to dictate the operation of the gear changing mechanism, connections between the clutch shifting mechanism and the gear changing mechanism adapted, in the clutch releasing movement, to operate the gear changing mechanism from one speed position to another, a lock adapted to arrest the clutch-applying movement of the clutch shifting mechanism, and means operable by the selecting mechanism to control the operation of the lock.

5. In a gear shifting mechanism for automobiles, the combination with clutch shifting mechanism adapted to be operated in opposite directions to apply and release the clutch, of gear changing mechanism adapted to be shifted from a positive position first to neutral and then to a positive position, selecting means adapted to dictate the position to which the gear changing mechanism shall be shifted, connections between the clutch shifting mechanism and the gear changing mechanism adapted, in the clutch releasing movement, to operate the gear changing mechanism as dictated by the selecting means, and a lock, controlled in its operation by the selecting mechanism, adapted to arrest the clutch applying movement of the clutch shifting mechanism, thereby permitting the selecting mechanism to be set to one of the active positions and the gears changed accordingly in the reverse movement of the clutch shifting mechanism, whereby the gears may be shifted from one active position to another while the clutch is held disengaged.

6. In a gear shifting mechanism for automobiles, the combination with clutch shifting mechanism adapted to be operated in opposite directions to apply and release the clutch, of gear changing mechanism adapted to be shifted from a positive position first to neutral and then to a positive position, selecting means adapted to dictate the position to which the gear changing mechanism shall be shifted, connections between the clutch shifting mechanism and the gear changing mechanism adapted, in the clutch releasing movement, to operate the gear changing mechanism as dictated by the selecting means, and a lock adapted to arrest the clutch applying movement of the clutch shifting mechanism, and means controlled by the selecting mechanism to render said lock operative when the selecting mechanism is operated during the disengagement of the clutch, and means operated by the clutch shifting mechanism to render said lock inoperative when the selecting mechanism is operated during the engagement of the clutch.

7. In a gear shifting mechanism for automobiles, the combination with clutch shifting mechanism, including a turnable shaft, adapted to be operated in opposite directions to apply and disengage the clutch, of gear changing mechanism adapted to be shifted from a positive position first to neutral and then to a positive position, selecting means, including a turnable cam shaft, adapted to dictate a change of gears to either only a neutral position or to any positive position, connections between the clutch shifting mechanism and the gear changing mechanism adapted, in the clutch disengaging movement, to operate the gear changing mechanism as dictated by the selecting means, a lock adapted to arrest the clutch-applying movement of the first named turnable shaft, and connections between the cam shaft and the lock adapted to control the latter's operation.

8. In a gear shifting mechanism for automobiles, the combination of clutch shifting mechanism, a turnable member operated thereby, a second turnable member on the axis of the first turnable member, a releasable connection between said members, disks turnable on another axis, connections between the second turnable member and the disks adapted to turn them simultaneously in opposite directions, gear changing mechanism, selecting mechanism adapted to be operated to lock one or the other of said disks to the gear changing mechanism, a third turnable member on the axis of the other turnable members, connections between one of the disks and the third turnable member adapted to turn it in a direction opposite to that of the second turnable member, means to disrupt the driving connection between the first and second turnable members, and means to thereupon effect a driving connection between the first and third turnable members whereby the directions of movement of the latter, of the disks, and of the second turnable member, are reversed.

9. In a gear shifting mechanism for automobiles, the combination of clutch shifting mechanism, a turnable member operated thereby, a second turnable member on the axis of the first turnable member, a releasable connection between said members, disks turnable on another axis, connections between the second turnable member and the disks adapted to turn them simultaneously in opposite directions, gear changing mechanism, selecting mechanism adapted to be operated to lock one or the other of said disks to the gear changing mechanism, a third turnable member on the axis of the other turnable members, connections between one of the disks and the third turnable member adapted to turn it in a direction opposite to that of the second turnable member, means to disrupt the driving connection between the first and second turnable members, and means to thereupon effect a driving connection between the first and third turnable members whereby the directions of movement of the latter, of the disks, and of the second turnable member, are reversed, and coacting means on the first and second turnable members adapted, in said reverse movement of the latter, to contact and thus limit the movement of the clutch shifting mechanism.

10. In a gear changing mechanism for automobiles, the combination with two gear shifting members turnable on a common axis, of actuating members for the gear shifting members, clutch shifting mechanism and connections therefrom to turn the actuating members, selecting means controlling the actuation of the gear-shifting members by their actuating members, two releasable locks adapted to hold their respective gear shifting members from turning when the latter are in neutral position, and means, actuated in the release of one lock preparatory to turning the corresponding gear shifting member, to hold the other lock from release.

11. In a gear changing mechanism for automobiles, the combination with a turnable gear shifting member and an actuating member therefor, of clutch shifting mechanism and connections therefrom to turn the actuating member, selecting mechanism controlling the actuation of the gear shifting member by its actuating member, a locking device normally engaging the gear shifting member and holding it from turning, and a contrivance controlled by the clutch shifting mechanism and adapted to operate said locking device to disengage the same from said gear shifting member preparatory to the latter's actuation by said actuating member.

12. In a gear changing mechanism for automobiles, the combination with two gear shifting hubs turnable on a common axis, of hub actuating disks, clutch shifting mechanism and connections therefrom to turn the disks, selecting means controlling the actuation of the hubs by the disks, spring-actuated releasable locks engaging detents in the respective hubs and holding both of them from turning when the hubs are in neutral position, each of said locks when released moving independently of the other lock into position to act as a stop preventing the release of the other lock.

13. In a gear changing mechanism for automobiles, the combination with a gear shifting hub adapted to be turned into extreme positions dictating two different gear shifts and an intermediate neutral position, of hub actuating disks, clutch shifting mechanism and connections therefrom to turn the disks, selecting means controlling the actuation of the hub by the disks, a locking device adapted to engage the hub in any one of its said three positions, a contrivance controlled by the clutch shifting mechanism and adapted to operate said locking device to disengage the same when in one of its extreme positions to permit it remaining disengaged during the turning of the hub to its intermediate position, a second contrivance operable by the clutch shifting mechanism and adapted to operate said locking device to hold the same from engagement with the hub when the latter reaches its intermediate position, and means actuable by the selecting means to control the actuation of the second contrivance, whereby the latter may be rendered operative or inoperative dependent upon whether the selecting means dictate a shift to an active position or to neutral.

In testimony of which invention, I have hereunto set my hand, at Philadelphia, Pa., on this 30th day of September, 1916.

DEAN C. LEWIS.